United States Patent [19]
Wenrich et al.

[11] 3,725,637
[45] Apr. 3, 1973

[54] VOLTAGE-CURRENT SENSING SYSTEM FOR WELDERS AND THE LIKE

[75] Inventors: Carl M. Wenrich, Reading; Bernard W. Downs, Elverson, both of Pa.

[73] Assignee: Weld-Record Corporation, Elverson, Pa.

[22] Filed: May 6, 1971

[21] Appl. No.: 140,873

[52] U.S. Cl..................219/136, 219/131 R, 219/137
[51] Int. Cl. ..............................................B23k 9/00
[58] Field of Search.................................219/131, 219/135; 317/60 R, DIG. 5; 346/33 M, 33 MC, 33 S; 307/252 W

[56] References Cited

UNITED STATES PATENTS

| | | | |
|---|---|---|---|
| 2,340,114 | 1/1944 | Duis | 219/13 S |
| 3,535,491 | 10/1970 | Krolski | 219/131 R |
| 3,359,561 | 12/1967 | Shostek | 219/135 |
| 3,532,853 | 10/1970 | MacKinney et al. | 219/135 |
| 2,366,548 | 1/1945 | Oestreicher et al. | 219/135 |
| 2,027,224 | 1/1936 | David | 219/135 |

*Primary Examiner*—J. V. Truhe
*Attorney*—William J. Ruano

[57] ABSTRACT

This invention relates to a system for making a record of the amount of work actually produced by an arc welder or similar machine for a given period of time. The arc welder may be energized, for example, for eight hours but may be actually welding for only four or five hours. The system includes a current sensor which records only when at least minimum arc currents flow, and a voltage sensor which records only when at least voltages sufficient to sustain an arc and which are greater than those at which short circuit occur. The simultaneous occurrence of both such currents and voltages is necessary for recording.

4 Claims, 1 Drawing Figure

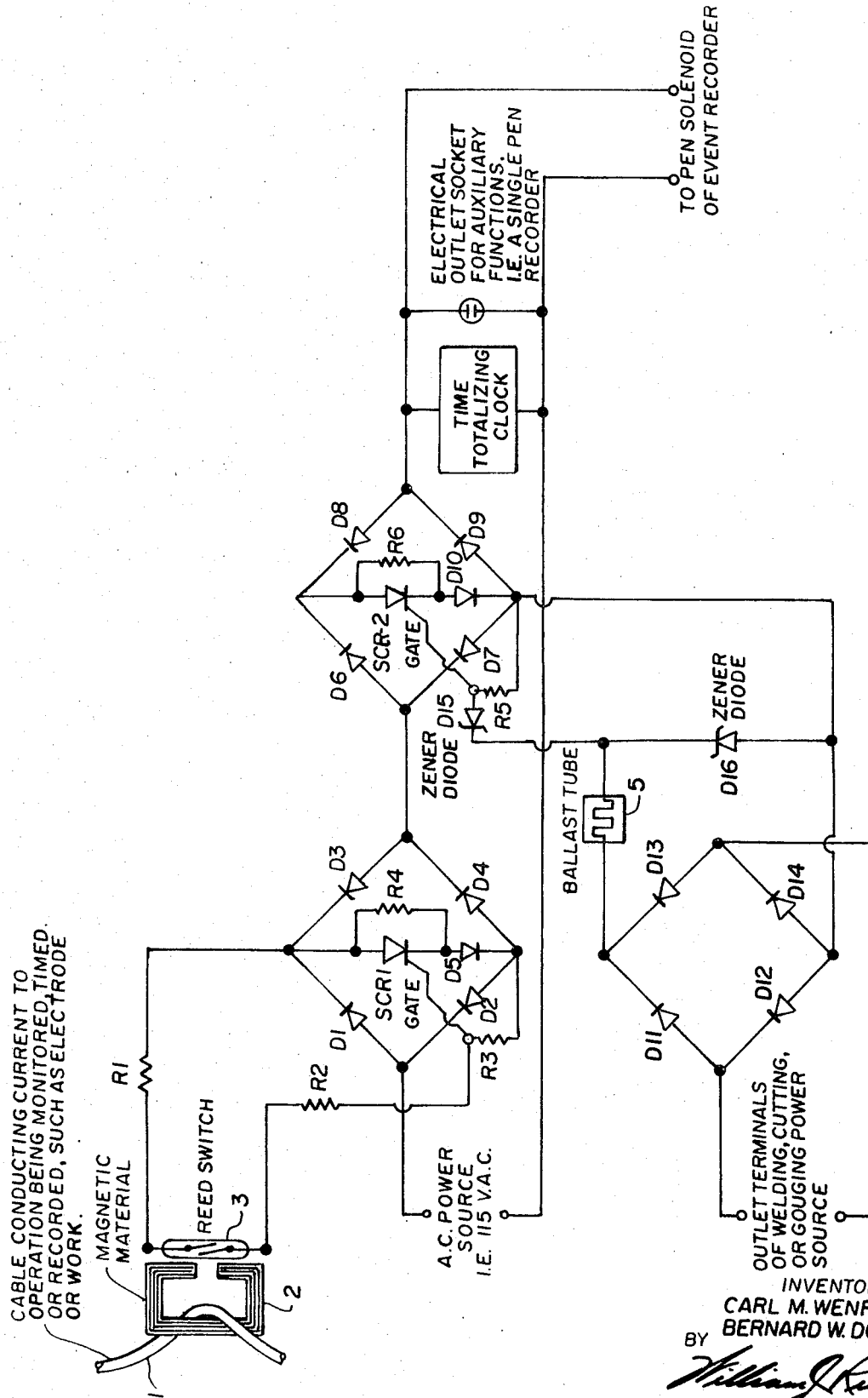

VOLTAGE-CURRENT SENSING SYSTEM FOR WELDERS AND THE LIKE

The present invention relates to a novel system for making a record of the amount of work produced by an arc welder or similar machine for any period of time, — sometimes referred to as its operating factor. For example, an arc welder may be energized for 8 hours, but may be actually welding 4 or 5 hours.

If industry could accurately determine the percentage of time during which production welding occurs, a number of benefits would accrue. This percentage of arc-time is also referred to as "Duty Cycle." The benefits are as follows:

1. An accurate picture of relative productivity of individual welders could be ascertained, thereby establishing an impartial means for rejection of personnel for cause or conversely rewarding good workers.

2. An accurate and impartial incentive payment plan could be set up in order to voluntarily increase production.

3. An accurate means would be available to precisely determine costs on operations not previously experienced, thereby making it much easier to quote accurately.

4. Where a different method or process is being considered for a particular job, an accurate comparison can be made if the arc-time only can be segregated from all other phases of operations.

5. An unquestionable record of arc-time is needed which will overcome the great deal of argument prevalent in many cases between production control and labor, as to the accuracy of the human being punching the stop watch, while trying to follow the "on" and "off" timing of the arc. Many times, it is necessary for the re-study of an operation because labor questions the accuracy of stop watch timing of production welding.

A number of difficulties exist when one tries to determine actual productive time.

1. There is a human tendency for an operator to try to defeat a system which is used to evaluate him. Therefore, any such system needs to be tamper-proof.

2. In many cases, when a single parameter, such as "End of Stroke" on a punch press is measured and used as a basis, the results are meaningless because a press strokes just as effectively with parts in it as without parts in it. So, in this case, the presence of a part and a press stroke should be required in order to record that stroke.

In the case of an arc welder, the machine could be made to deliver current into a relative short circuit, or to produce the proper generator (power source) voltage level to record the presence of welding, without actually welding. However, if both parameters are required it becomes much easier to weld than to try to defeat a system.

An object of our invention, therefore, is to record production time while making difficult any attempts to defeat the recording system, by providing a novel instrument which basically requires that two or more inputs be present before the recording operation can take place.

Other objects and advantages will become more apparent from a study of the following description taken with the accompanying drawing wherein:

The single FIGURE is a circuit diagram of a voltage-current sensing system to record the actual welding time of an arc welder or the like.

Referring more particularly to the FIGURE, the secondary welding cable 1 that conducts welding current to the electrode or work is passed through a device which senses the presence of magnetic flux around a conductor resulting from current passing through it. One way of doing this would be to provide an encircling magnetic structure 2 formed of soft iron or other highly magnetic material. Any current in the cable 1 would provide a magnetic field which would be concentrated by the high permeability of the iron. Soft iron is approximately two thousand times the magnetic flux in the iron as there would appear in the same area in air. If a gap is provided in the encircling iron magnetic structure, and a suitable magnetic reed switch 3 is positioned at that gap, then when welding current of sufficient magnitude flows, the reed switch 3 will close. This alone could operate a recorder. However, if the operator simply short circuited his electrode, he would produce sufficient current to close the switch 3, thereby defeating the recording system.

When the operator short circuits his electrode, generator (power source) voltage is reduced below that which would be normal when an arc is being held or maintained.

Therefore, in accordance with the present invention there is provided another sensing system in the instrument which measures the arc voltage.

When the operator is producing a normal arc, he has simultaneously the correct minimum welding current and the correct minimum arc voltage. Those two factors together simultaneously occuring turn on the recording instrument.

We have already described one basic method of sensing current.

When the reed switch closes, SCR-1 of the instrument is turned on. AC power (normal 115 volt AC 60 Cycles) is allowed to proceed along the following path, during the positive cycle, through diode D-1, through silicon controlled rectifier SCR-1 and diode D-5, and through diode D-4 to the recording instrument. On the reverse cycle, the flow is through diode D-3, through rectifier SCR-1 and diode D-5, and through diode D-2 back to the AC power source (115 volt AC 60 cycles).

Note that if rectifier SCR-1 is not turned on, there is an open circuit. During the positive cycle, diode D-1 feeds diode D-3, which diodes oppose each other, thereby preventing current flow to the recorder.

The same situation exists with diodes D-2 and diode D-4, on the reverse cycle. Note that when current flows in either the positive or reverse cycle, it passes through rectifier SCR-1 in the same direction for both conditions.

When the gate of an SCR (silicon controlled rectifier) is made more negative than the cathode, the SCR will not conduct in either direction, — but when the gate is made more positive than the cathode, the SCR turns on like a switch. The diode bridge, formed by diodes D-1, D-2, D-3 and D-4, provides that the anode of silicon controlled rectifier SCR-1 be always zero or positive, — and never negative. If the anode of SCR-1 is connected to the gate, whenever the junction of diodes D-1, D-3 rises above zero, rectifier SCR-1 will turn on.

The gate of rectifier SCR-1 cannot conduct safely as much current as the SCR could deliver, so current limiting resistors R-1 and R-2 are used to prevent heavy gate currents, thereby protecting the SCR when the reed switch is closed. Diode D-5 is connected to junction of diodes D-2 and D-4, and to the cathode of SCR-1.

A diode, when conducting, has a relatively fixed voltage across it. A germanium diode has approximately 0.2 of a volt drop across it, and a silicon diode has approximately 0.7 of a volt drop across it. Since diode D-5 and rectifier SCR-1 are in series, when rectifier SCR-1 is turned off, there will be very little current flow, so a high resistance R-4 is bridged across rectifier SCR-1 so that a certain minimum of current will flow in diode D-5. The gate of rectifier SCR-1 is connected through resistor R-3 to the junction of diodes D-2, D-4 and D-5, which junction is at least 0.2 of a volt more negative than a cathode of rectifier SCR-1. This bias is advisable so that dependable operation of the SCR is guaranteed. When the reed switch 3 is closed, the current flowing through resistors R-1 and R-2, thence through resistor R-3 will develop a voltage across resistor R-3 greater than 0.2 of a volt, turning rectifier SCR-1 on. Note that as soon as the gate becomes positive, the SCR turns on.

The voltage sensing circuit may be traced as follows. Since a welding current source can be either alternating or direct current, and a device which is to turn on an SCR, should provide a positive polarity, a switch is provided in the form of a bridge network of diodes D-11, D-12, D-13 and D-14. If a welding power source of any polarity were connected to the junction of diodes D-11 and D-12, and the junction of diodes D-13 and D-14, current flows in the diodes and would provide that the junction of diodes D-11 and D-13 would always be positive with respect to the junction of diodes D-12 and D-14.

Diode D-16 is a special type of diode which offers a high resistance to the flow of current in its inverse direction until a specific breakdown voltage appears across it. At that time, the diode starts to draw current and could, without some form of current limiting, be destroyed. A resistance, in this case, a ballast tube 5, is therefore placed in series. A circuit is thus provided which will produce a voltage across diode D-16, resulting from a voltage impressed across the diode assembly D-11, D-12, D-13 and D-14, from the welding power source.

The voltage across diode D-16 will be proportional to the welding current source voltage, up to the time when the breakdown voltage of diode D-16 is reached. Voltage across diode D-16 now remains constant even though the welding source voltage increases. In this manner, D-16 provides that a maximum voltage will be present for the gate circuit of SCR2, making it easier to provide that the allowable gate current for SCR 2 will not be exceeded.

The resistance of the ballast tube 5, when it is cold, is relatively low and offers little hindrance to the current through diode D-16. As the current through the ballast tube 5 increases after diode D-16 starts to conduct, elements within the ballast tube become warm, thereby rapidly increasing in resistance and offering greater hindrance to current through diode D-16, thereby protecting the diode through a much wider range of input voltage variation.

The circuit comprising rectifier SCR-2, diodes D-6, D-7, D-8, D-9 and D-10 and resistors R-6 and R-5, is identical to the circuit which includes rectifier SCR-1, and the gate of rectifier SCR-2 is held negative through resistor R-5 just as the gate of rectifier SCR-1 was held negative through resistor R-3. In the absence of positive voltage on the gate of rectifier SCR-2, there will be no current flow from the junction of diodes D-6 and D-7, to the junction of diodes D-8 and D-9. Therefore, even if the SCR-1 circuit were conducting, the recording instrument would not be energized.

If SCR-1 and SCR-2 circuits are both energized, the AC power source (115 volt AC 60 cycles) would be connected to the recording instrument.

Zener diode D-15 is selected so that its breakdown voltage, (the voltage at which it starts to conduct current), is just below that minimum voltage required to maintain an arc.

If the output terminals of the welding current source are connected to the diode bridge comprising diodes D-11, D-12, D-13 and D-14, there will be no current in resistor D-5 until the current source voltage is equal to or greater than the breakdown voltage of diode D-15.

Resistor R-5 is selected so that the current through diode D-15 will be limited to a value that can be safely conducted by diode D-15. It is evident that when the welding current source voltage is equal to the necessary arc voltage and when there is sufficient welding current to close the reed switch 3, the recorder will operate. If either current or voltage is incorrect, the recorder will not operate.

The ballast tube and diode D-16 provide protection for diode D-15 and resistor R-5, as the voltage across diode D-16 is regulated to a safe maximum by the action of the ballast tube 5 and diode D-16, as previously described.

It should be noted that the voltage-current sensing system of the present invention is useful on all production electric welding, gouging and cutting applications or non-production operations thereof. Furthermore, it is applicable to AC or DC (constant current or constant voltage) power sources (machines). Such power sources may be motor generator DC sources or rectifier DC sources.

While we have illustrated and described a single specific embodiment of our invention, it will be understood that this is by way of illustration only and that various changes and modifications may be contemplated within the scope of the following claims.

We claim:

1. In combination with an arc welder having a power source and a cable that conducts welding current, a core of magnetic material magnetically coupled to said cable, a switch immediately adjacent said core and which closes in response to a predetermined value of magnetic flux induced in said core by said cable in response to welding current flow through said cable, an AC source of power, a recorder, first and second full wave rectifying bridge circuits connected in series between said AC source of power and said recorder, each rectifying bridge including four diodes in the respective four legs of the bridge circuit and a silicon controlled rectifier connected in the direct current to conduct current in the output leg upon actuation of the gate of the silicon controlled rectifier, output leg of each bridge circuit means responsive to the closing of said switch for actuating the gate of the silicon controlled rectifier of the first bridge circuit, a third diode full wave rectifier having input terminals connected to sense the voltage output of the welding power source and input terminals output, and means responsive to a predetermined voltage at said output terminals for actuating the gate of the silicon controlled rectifier of the second bridge circuit, whereby a circuit to said recorder will be completed only upon simultaneous occurrence of predetermined values of welding current and voltage.

2. A system as recited in claim 1 wherein said switch responsive to welding current is a reed switch, and wherein said core is partially looped about said cable, thereby providing an air gap adjacent which said first mentioned switch is placed.

3. A system as recited in claim 1 wherein said voltage responsive means comprises a zener diode interconnecting said third rectifier and said last mentioned gate.

4. A system as recited in claim 3 further comprising a ballast tube in series with said zener diode and one of the terminals of said third rectifier, and wherein a second zener diode together with said ballast tube are serially bridged across the output terminals of said third rectifier.

* * * * *